(12) United States Patent
Kamble et al.

(10) Patent No.: US 7,403,970 B1
(45) Date of Patent: Jul. 22, 2008

(54) METHOD AND APPARATUS FOR ASSIGNING A VIRTUAL ADDRESS TO AND TEXT-MESSAGING TO MULTIPLE TEXT-CAPABLE DESTINATION ENTITIES

(75) Inventors: Sanjay Kamble, Sunnyvale, CA (US); Vikas Sanathana Murthy, Fremont, CA (US); Julian Philips, Bangalore (IN); Rajesh Tanamala Srinivas Reddy, Sunnyvale, CA (US)

(73) Assignee: Verisign, Inc., Mountain View, CA (US)

( * ) Notice: Subject to any disclaimer, the term of this patent is extended or adjusted under 35 U.S.C. 154(b) by 1042 days.

(21) Appl. No.: 09/695,235

(22) Filed: Oct. 25, 2000

(51) Int. Cl.
*G06F 15/16* (2006.01)

(52) U.S. Cl. ............... 709/206; 709/224; 709/239; 455/461; 455/557; 455/415

(58) Field of Classification Search ............... 709/206, 709/239, 223, 224; 455/461, 557, 415; 711/141; 715/762
See application file for complete search history.

(56) References Cited

U.S. PATENT DOCUMENTS

| | | | |
|---|---|---|---|
| 4,313,035 A | 1/1982 | Jordan et al. ............... 179/18 |
| 4,745,632 A | 5/1988 | Duffy ....................... 379/58 |
| 5,161,184 A | 11/1992 | Smith et al. |
| 5,197,092 A | 3/1993 | Bamburak ................ 379/59 |
| 5,243,645 A | 9/1993 | Bissell et al. ............ 379/211 |
| 5,315,636 A | 5/1994 | Patel ....................... 379/58 |
| 5,414,752 A | 5/1995 | Jonsson |
| 5,504,804 A | 4/1996 | Widmark et al. |
| 5,506,894 A | 4/1996 | Billings et al. ........... 379/127 |
| 5,706,339 A | 1/1998 | Eisdorfer et al. .......... 379/211 |
| 5,742,668 A * | 4/1998 | Pepe et al. ............... 455/415 |
| 5,742,905 A * | 4/1998 | Pepe et al. ............... 455/461 |
| 5,754,640 A | 5/1998 | Sosnowski ............... 379/221 |
| 5,758,286 A | 5/1998 | Leppanen |
| 5,758,293 A | 5/1998 | Frasier |
| 5,781,614 A | 7/1998 | Brunson |
| 5,805,804 A * | 9/1998 | Laursen et al. ............... 709/223 |
| 5,892,822 A | 4/1999 | Gottlieb et al. ............. 379/220 |
| 5,903,638 A | 5/1999 | Welter, Jr. et al. .......... 379/220 |
| 5,920,815 A | 7/1999 | Akhavan ................... 455/426 |
| 5,933,483 A | 8/1999 | Pellegrino et al. .......... 379/201 |
| 5,937,053 A | 8/1999 | Lee et al. .................. 379/220 |
| 5,946,629 A | 8/1999 | Sawyer et al. |
| 5,978,672 A | 11/1999 | Hartmaier et al. .......... 455/413 |

(Continued)

FOREIGN PATENT DOCUMENTS

WO  WO 97/26764  9/1997

(Continued)

*Primary Examiner*—William C. Vaughn, Jr.
*Assistant Examiner*—Thanh T Nguyen
(74) *Attorney, Agent, or Firm*—Townsend and Townsend and Crew LLP (57) ABSTRACT

A virtual address is configured. A destination address and a capability information associated with each destination entity of a set of destination entities associated with a destination party are configured. Each destination entity from the set of destination entities is a push-capable, text-message-capable entity. Each destination entity from the set of destination entities is associated with a virtual address. The virtual address defines a destination remote from the destination party and remote from premises associated with the destination party.

7 Claims, 5 Drawing Sheets

U.S. PATENT DOCUMENTS

| | | | | |
|---|---|---|---|---|
| 6,011,843 | A | 1/2000 | Hochman et al. | 379/211 |
| 6,018,737 | A * | 1/2000 | Shah et al. | 707/10 |
| 6,028,917 | A | 2/2000 | Creamer et al. | 379/100.01 |
| 6,038,644 | A * | 3/2000 | Irie et al. | 711/141 |
| 6,052,457 | A | 4/2000 | Abdelaal et al. | 379/220 |
| 6,069,945 | A | 5/2000 | Brown et al. | 379/220 |
| 6,084,969 | A * | 7/2000 | Wright et al. | 380/271 |
| 6,104,789 | A | 8/2000 | Lund | |
| 6,108,709 | A * | 8/2000 | Shinomura et al. | 709/239 |
| 6,125,176 | A * | 9/2000 | Foladare et al. | 379/211.02 |
| 6,157,945 | A | 12/2000 | Balma et al. | |
| 6,389,276 | B1 * | 5/2002 | Brilla et al. | 455/413 |
| 6,584,095 | B1 * | 6/2003 | Jacobi et al. | 370/352 |
| 6,628,965 | B1 * | 9/2003 | LaRosa et al. | 455/557 |
| 6,643,686 | B1 * | 11/2003 | Hall | 709/206 |
| 6,690,394 | B1 * | 2/2004 | Harui | 715/762 |
| 6,834,324 | B1 * | 12/2004 | Wood | 711/111 |
| 7,003,555 | B1 * | 2/2006 | Jungck | 709/219 |
| 2003/0120811 | A1 * | 6/2003 | Hanson et al. | 709/245 |

FOREIGN PATENT DOCUMENTS

| | | |
|---|---|---|
| WO | WO 97/50230 | 12/1997 |
| WO | WO 98/00987 | 1/1998 |
| WO | WO 98/26621 | 6/1998 |
| WO | WO 00/04679 | 1/2000 |
| WO | WO 00/04689 | 1/2000 |
| WO | WO 00/16571 | 3/2000 |
| WO | WO 00/22800 | 4/2000 |
| WO | WO 00/42809 | 7/2000 |
| WO | WO 00/72612 | 11/2000 |

* cited by examiner

FIG. 1

| Destination Party Virtual Address (310) | Destination Entity Address (320) | Destination Entity Device Type (330) | Output Capability (340) | Current Availability (350) | Message Delivery Cost (360) |
|---|---|---|---|---|---|
| smith@company.com | 1-555-555-1212 | text-message-capable wireless phone | 120-character display with DTMF response | Always Available | High |
| | jsmith | Instant Messaging | Personal Computer GUI | Available | Low |
| | jsmith@xyz.com | Work e-mail | Personal Computer GUI | Not Available | Low |

METHOD AND APPARATUS FOR ASSIGNING A VIRTUAL ADDRESS TO AND TEXT-MESSAGING TO MULTIPLE TEXT-CAPABLE DESTINATION ENTITIES

CROSS-REFERENCES

The present invention is related to patent applications "Universal Address Recognition for Text-Capable Communication Devices" Ser. No. 09/695,233 and "Seamless Selection from at Least Two Destination Entities for Text Messaging" Ser. No. 09/695,234, both of which are incorporated herein by reference.

BACKGROUND OF THE INVENTION

The present invention relates generally to electronic messaging. More specifically, the present invention relates to assigning a virtual address to and messaging to multiple text-capable destination entities.

Known systems have been disclosed that allow a subscriber to have a single personal telephone directory number. As a telephone call is sent to such a subscriber, the telephone call can be routed to the present or last known location of the subscriber. Such systems determine this present or last known location of the subscriber in various ways.

For example, some of these known systems determine a subscriber's location through the use of a radio transmitter physically carried on the subscriber's person. For example, U.S. Pat. No. 5,315,636 to Patel discloses a system where the subscriber physically carries a wireless personal communicator on their person. A number of radio base stations can determine the location of the subscriber through communications with the personal communicator. In another example, U.S. Pat. No. 6,125,176 to Foladare et al. discloses a system where the location of a subscriber is determined based on the status of general purpose electronic devices (e.g., television, oven and/or computer) within the subscribers home.

Other known systems are based on call forwarding techniques where a calling party dials one telephone number and the call can be then forwarded to another telephone number. U.S. Pat. No. 4,313,035 to Jordan et al., discloses a personal locator number uniquely assigned to a subscriber. The personal locator number is unique to the subscriber nationwide and is used in conjunction with a service code, e.g., "700". The subscriber dials "0" followed by "700" and the personal locator number from any telephone. From this telephone, the subscriber can provide the number of that telephone so that subsequent telephone calls from a calling party can be forwarded to the subscriber at that telephone number.

These known systems, however, suffer several shortcomings. First, these known systems are limited to telephone calls having audio content, but do not consider other types of content. In addition to different types of content, these devices do not consider different types of devices and the different capabilities of those devices. In other words, all calls are treated identically regardless of the destination devices and their capabilities.

Second, these known systems are limited in how the communication devices of the subscriber can be configured with a common telephone number. On the one hand, some of these known systems allow incoming telephone calls to be routed among multiple communication devices of a subscriber based on devices that are physically located on the subscriber's premises or person. On the other hand, other known systems allow the telephone call to be received at a location remote from the subscriber's premises where the subscriber remotely dials in to set call-forwarding parameters. In sum, these known systems fail to associate a telephone number remote from the subscriber's premises that can still be associated with the communication devices of a subscriber.

SUMMARY OF THE INVENTION

A virtual address is configured. A destination address and a capability information associated with each destination entity of a set of destination entities associated with a destination party are configured. Each destination entity from the set of destination entities is a push-capable, text-message-capable entity. Each destination entity from the set of destination entities is associated with a virtual address. The virtual address defines a destination remote from the destination party and remote from premises associated with the destination party.

DETAILED DESCRIPTION

A virtual address is configured. A destination address and a capability information associated with each destination entity of a set of destination entities associated with a destination party are configured. Each destination entity from the set of destination entities is a push-capable, text-message-capable entity. Each destination entity from the set of destination entities is associated with a virtual address. The virtual address defines a destination remote from the destination party and remote from premises associated with the destination party.

The inventors have recognized that with the proliferation of different types of communication devices and their respective capabilities, it is increasingly difficult to communicate across these different devices, many different types of which can be owned by the same party. For example, one party with a wireless phone and computer can have difficulty communicating with another party that has a pager and a landline phone. Thus, the inventors have further recognized that one way to solve this problem is to develop a system that provides universality for text messages across all types of text-capable, push-capable communication entities.

Many advantages result from associating multiple destination entities with a virtual address of the destination party. Many different types of text-capable destination entities can be commonly addressed with the same virtual address, such as for example text-message-capable, push-capable pagers, wireless phones, handheld wireless devices and desktop computer applications (e.g., a text messaging applications or instant-messaging desktop applications). Consequently, different messages having different formats from different devices having varying communication protocols can be reduced to a common aspect of the text portion and then more easily reformatted to match the capabilities of the appropriate destination entity (e.g., language, character set, etc.).

Advantageously, a single service point is available because multiple destination entities are associated with the virtual address. Consequently, destination parties can add and/or drop destination entities without having to notify future source parties on the current status of the various destination entities. In addition, messaging can be processed conveniently at a single service point. For example, filtering certain sources for all destination entities or specifying rules for intelligent routing can be performed at a single service point.

Moreover, the services applied to and the routing of messages across the various destination entities can take into account the various characteristics of the destination entities. For example, the number of text messages routed to the same text-capable wireless phone can be limited (e.g., to five within an hour) while messages routed to the same desktop application (e.g., e-mail application) can be unlimited. Thus, the routing of messages can be tailored to the appropriateness for the given destination entity, messages to wireless phones can be limited to avoid annoyance and messages to a desktop application can be unlimited.

The destination entities are push-capable, text-message-capable entities in the sense that they can receive text messages. The term "text message" is used herein to mean an electronic message having a text-based portion where the information carried within the text-based portion is relatively short in length and is in a human-readable format. Such a text message can be, for example, an alphanumeric message up to 160 alphanumeric characters, commonly referred to as Short Message Service (SMS) messages in the context of messages from base stations to pagers, mobile phones and/or other handheld wireless devices. A text message can be used, for example, to carry short pieces of information such as abbreviated (or otherwise filtered) e-mails, stock quotes, updates on traffic conditions, or other relatively short alphanumeric messages. A text message can be, for example, an e-mail message having a text portion and a non-text portion, such as an attached file or a graphic component; the text portion of such a message is of particular interest while the other non-text portions can be, for example, removed through reformatting, as discussed below. A text-based portion of a text message is relatively short in the sense it can be practically read from the displays of most text-capable devices, including such devices having a limited user interface (e.g., a 120-character interface typical of wireless phones).

Figure 1:
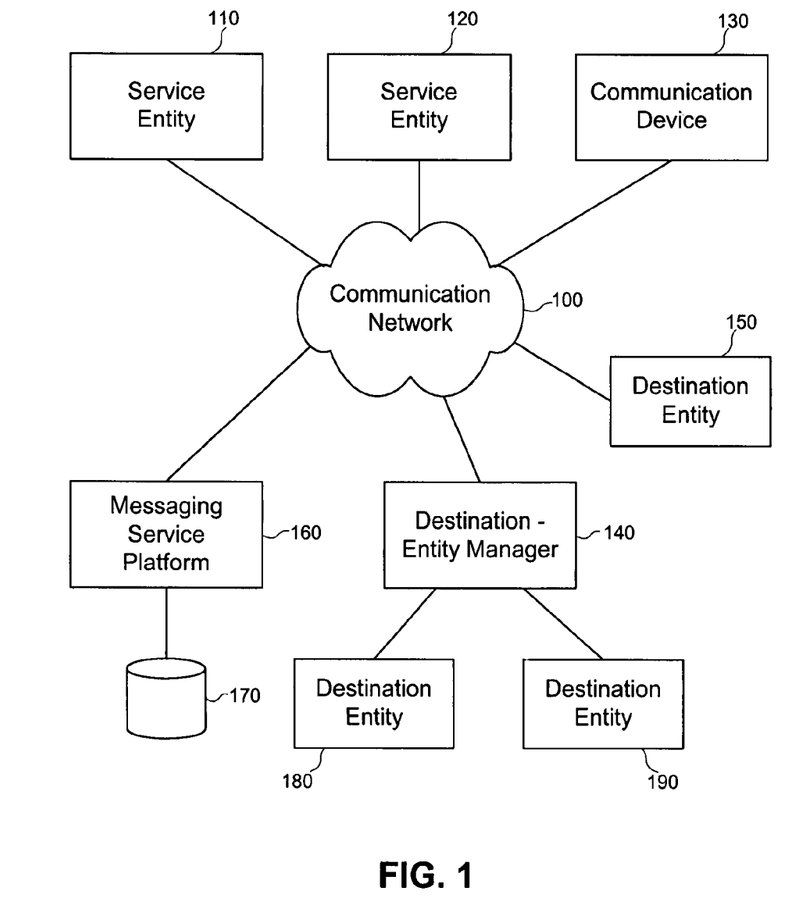
FIG. 1 illustrates a system block diagram of a communication system, according to an embodiment of the present invention.

FIG. 1 illustrates a system block diagram of a communication system, according to an embodiment of the present invention. Communication network 100 is coupled to service entities 110 and 120, communication device 130, destination-entity manager 140, destination entity 150, and messaging service platform 160. Messaging service platform 160 is also coupled to storage device 170. Destination-entity manager 140 is also coupled to destination entities 180 and 190.

Service entities 110 and 120 can be any type of service provider or content provider that provides electronic content over communications network 100. For example, the service entity 110 can be a web-based service that provides push-based content, such as a newspaper, which provides a periodic and automatically-sent electronic text-based version of the newspaper from the service entity 110 to a previously designated destination party. In this example, the content from service entity 110 is pushed to the destination entity rather than being fetched (or pulled) from the service entity by the destination entity. Said another way, the content from service entity is "pushed" to the destination entity because the service entity provides specific content based on a previously general request.

Communication network 100 can be any type of appropriate network capable of transmitting voice and/or data. Communication network 100 can be, for example, any interconnecting network such as an intranet (e.g., a local or wide area network), or an extranet (e.g., the World Wide Web or the Internet). Communication network 100 can include various wireless connections as well.

Destination entities 150, 180 and 190 can be any appropriate type of communication device and/or computer-based application that is text-message-capable and push-capable. For example, destination entities 150, 180 and 190 can be text-message-capable, push-capable pagers, wireless phones, handheld wireless devices (e.g., a personal digital assistant (PDA) or handheld personal computer (HPC)) and/or desktop computer applications. The desktop computer applications can be, for example, a text messaging application, an instant-messaging desktop application or any other type of text-message-capable, push-capable application that is connected to a communication network, such as the Internet via a computer.

Destination entity manager 140 is a type of communication device that can manage other destination entities. For example, destination entity manager 140 can be an operating system of a personal computer that allows multiple computer software applications (e.g., desktop applications) to run on that personal computer. In such an example, destination entity manager 140 can be a computer operating system, such as Microsoft Windows, and destination entities 180 and 190 can be desktop applications, such as AOL Instant Messaging and Microsoft Outlook e-mail program.

Messaging service platform 160 is a computer hardware and/or software system capable of interacting with communication network 100 and capable of receiving text messages over communication network 100. Messaging service platform 160 has the appropriate hardware and/or software to route text messages according to embodiments of the present invention. For example, messaging service platform 160 can have hardware and/or software that performs the method described below in conjunction with FIGS. 2 and 3. Storage device 170, which is coupled to messaging service platform 160, can store various databases to be used in conjunction with the methods performed by messaging service platform 160.

Figure 2:
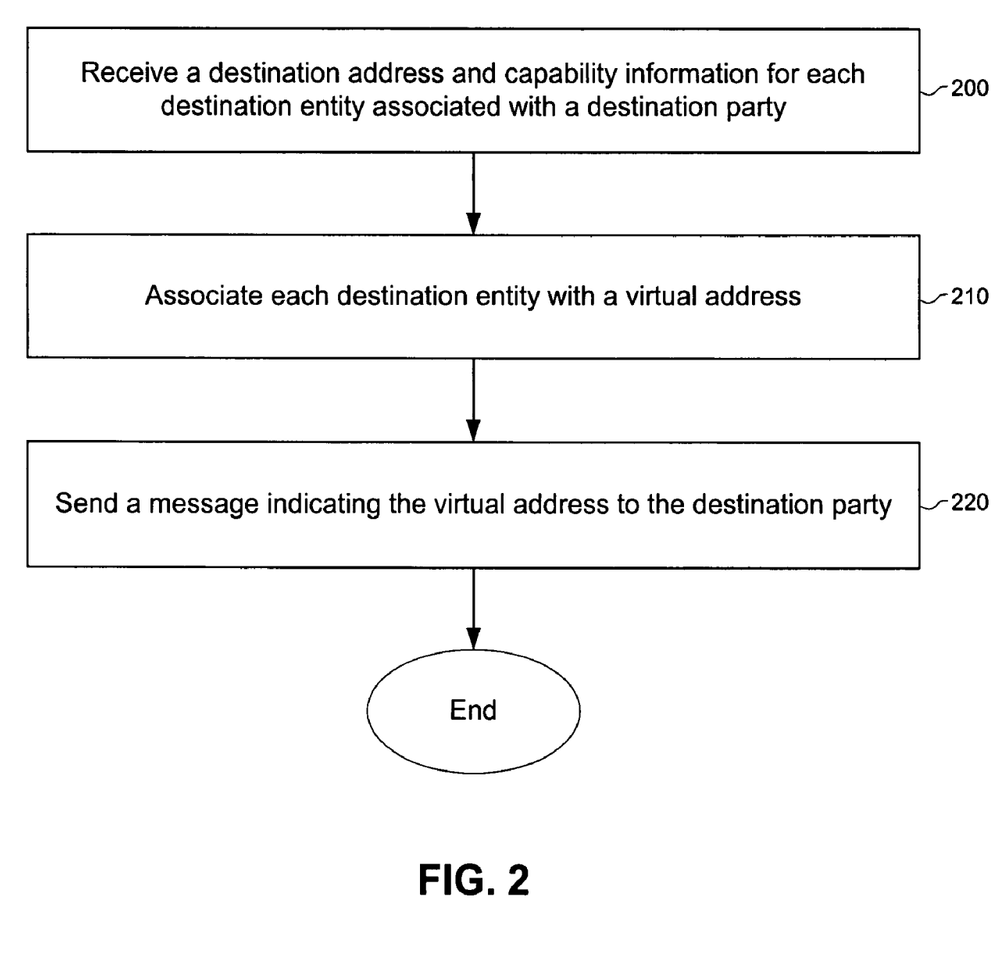
FIG. 2 illustrates a process for associating destination entities with a virtual address, according to an embodiment of the present invention.

FIG. 2 illustrates a process for associating destination entities with a virtual address, according to an embodiment of the present invention. The process illustrated in FIG. 2 can be performed, for example, by messaging service platform 160 in conjunction with storage device 170. In other words, the process illustrated by FIG. 2 can be performed by messaging service platform 160 in response to, for example, destination entities 150, 180 and/or 190, through the use of a database(s) stored in storage device 170. Note that the destination party is enrolling in a service and as such is initially the calling party with respect to the messaging service platform 160; the enrolling party is referred to herein as the "destination party" for clarity and consistency throughout the Detail Description section.

At step 200, a destination address and capability information for each destination entity associated with a destination party is received. At step 210, the destination address and capability information for each destination entity is associated with a virtual address. The virtual address can have any type of appropriate format that allows for message accessibility across different types of networks for different types of communication devices. For example, the virtual address can have an alphanumeric e-mail format so that text messages can be sent from e-mail address compatible entities such as desktop applications. Alternatively, the virtual address can have a numeric format so that text messages can be sent from phone number compatible entities such as text-capable wireless phones.

The destination address and capability information for each destination entity can be associated with a virtual address via a database. For example, FIG. 3 illustrates an example of a database record associating a virtual address with destination entity addresses, according to an embodiment of the present invention.

Figure 3:
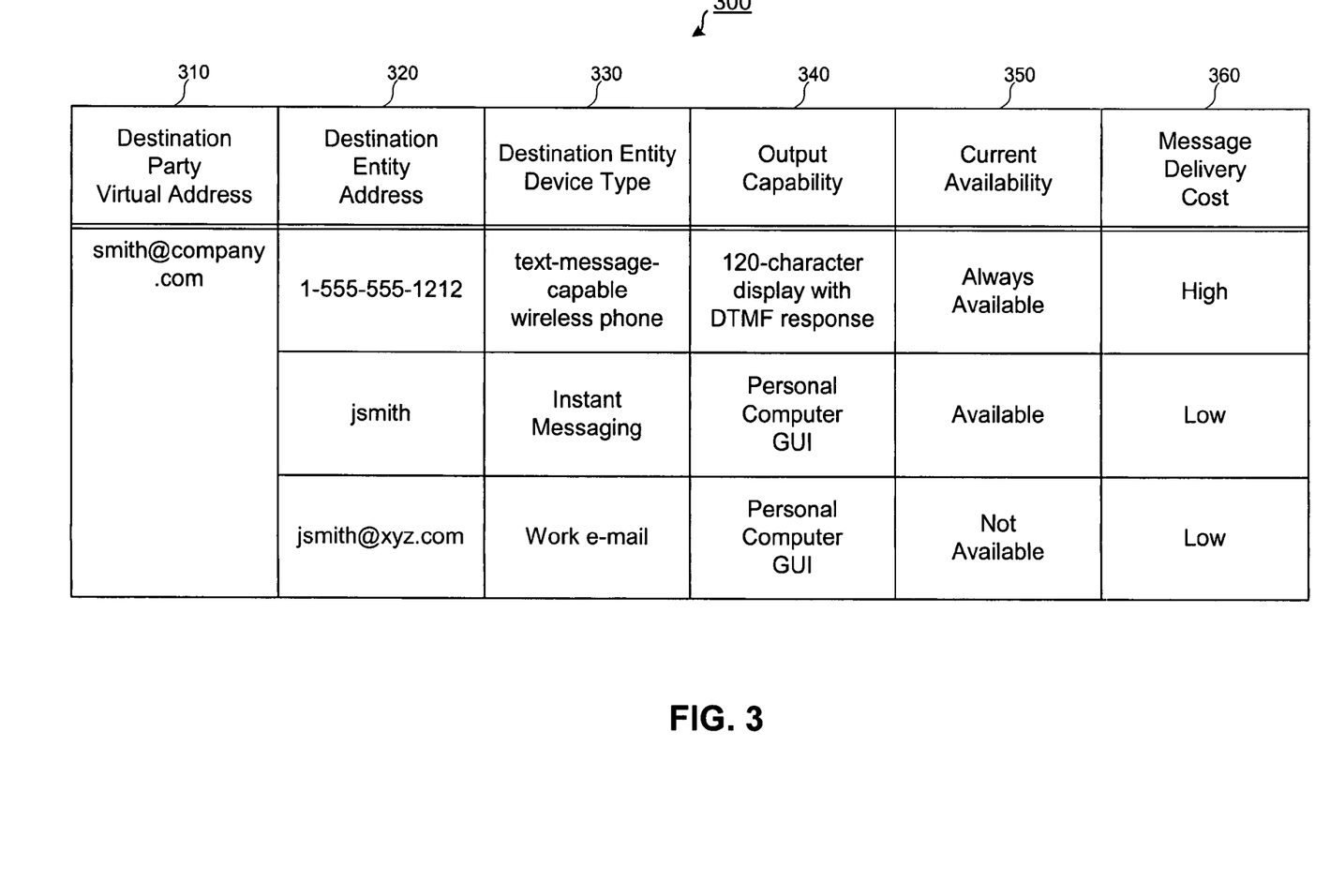
FIG. 3 illustrates an example of a database record associating a virtual address with destination entity addresses, according to an embodiment of the present invention.

FIG. 3 illustrates an example of a database record 300 that includes destination party virtual address 310, destination entity address 320, destination entity device type 330, output capability 340, current availability 350 and message delivery cost 360. In the example of database record 300, a destination party virtual address 310 (e.g., "smith@company.com") is associated with three destination entity addresses (e.g., "1-555-55-1212", "jsmith" and "jsmith@xyz.com").

Figure 4:
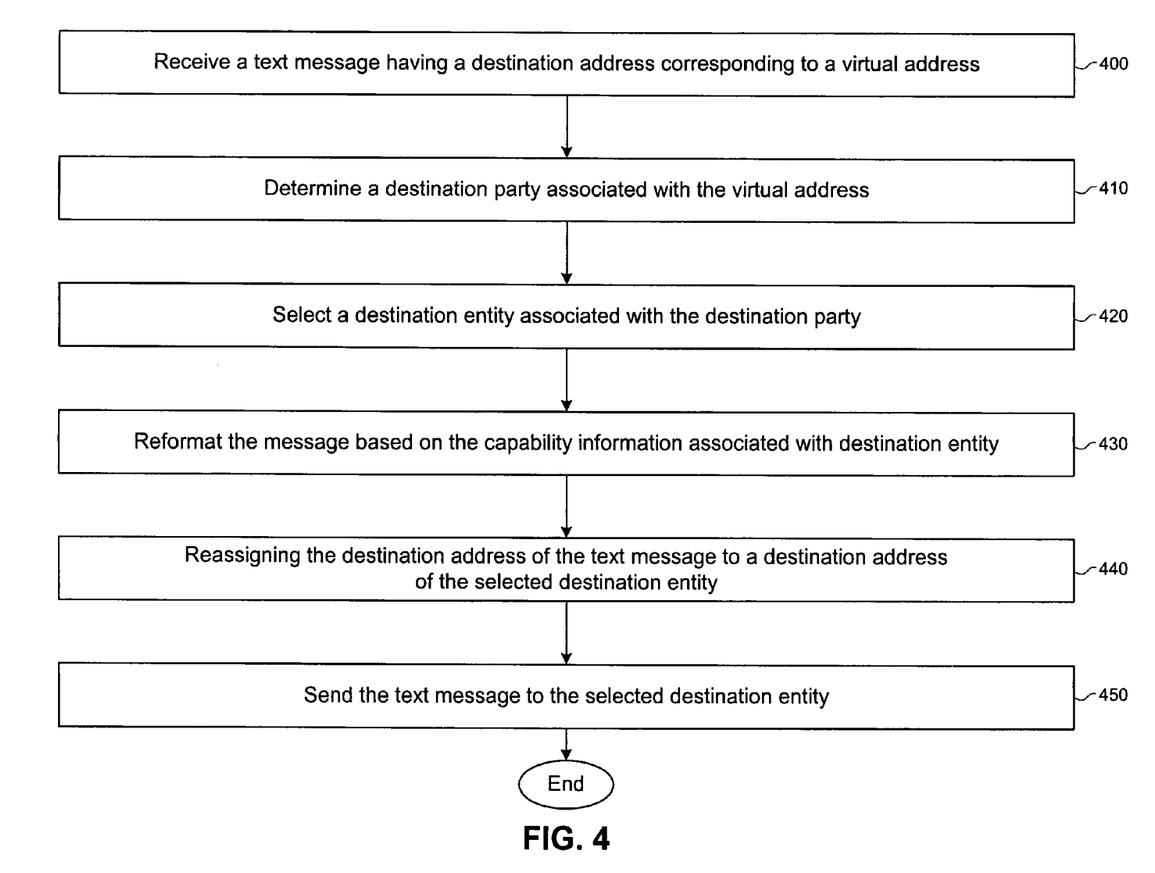
FIG. 4 illustrates a process for routing text messages to at least one destination entity associated with a destination party, according to an embodiment of the present invention.

Returning to FIG. 2, at step 220, a message indicating the virtual address is sent to the destination party. Upon receiving this message, the destination party has completed the enrollment process and can notify future message source parties of the virtual address. Subsequently, future source parties can send messages to the virtual address rather than the individual destination entity addresses associated with the destination party. Once future messages for the destination party are received at messaging service platform 160, the messaging service platform 160 can determine to which destination entity associated with the destination party the messages should be sent. FIG. 4 further illustrates this process.

FIG. 4 illustrates a process for routing text messages to at least one destination entity associated with a destination party, according to an embodiment of the present invention. The process illustrated in FIG. 4 can be performed, for example, by messaging service platform 160 in conjunction with storage device 170. In other words, the process illustrated by FIG. 4 can be performed by messaging service platform 160 in response to text messages sent from, for example, service entities 110 or 120 or communication device 130. These text messages can be routed, for example, to destination entities 150, 180 and/or 190, through the use of a database(s) stored in storage device 170.

At step 400, a text message having a destination address corresponding to the virtual address is received. At step 410, a destination party associated with the virtual address is determined. This can be performed, for example, by finding a match of the virtual address to the destination party virtual address 310 in the database record 300 shown in FIG. 3.

At step 420, a destination entity associated with the destination party is selected. Using the example database record shown in FIG. 3, when the virtual address of the received text message is "smith@company.com" and matches the first destination party virtual address 310 of database record 300, then one of the three associated destination entities from destination entity address 320 will be selected. This selection process can be performed, for example, by the process described in related application "Seamless Selection from at Least Two Destination Entities for Text Messaging" Ser. No. 09/695,234, which is incorporated herein by reference. As this application describes, a destination entity is selected based on a dynamically sensed availability of a destination entity so that the latency associated with the destination party receiving and reading the sent text message is minimized.

Figure 5:
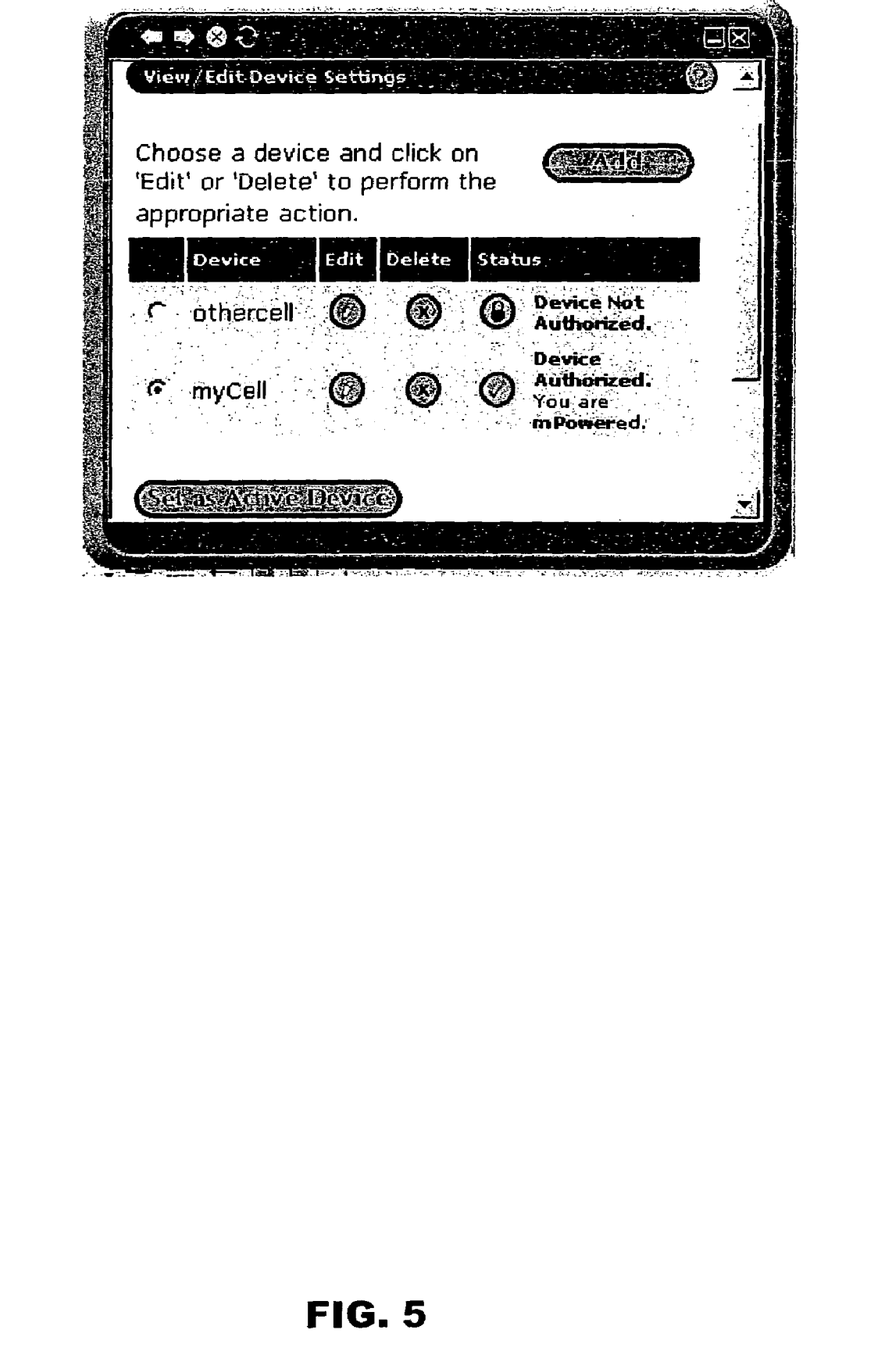
FIG. 5 illustrates an example of a portion of graphical user interface for a destination party to specify a preferred destination entity, according to an embodiment of the present invention.

Alternatively, the selection process can be, for example, based on criteria specified by the destination party. For example, the destination party can specify a preference order independent of the availability of the destination entities. FIG. 5 illustrates an example of a portion of graphical user interface (GUI) for a destination party to specify a preferred destination entity, according to an embodiment of the present invention. As illustrated in FIG. 5, the destination party having multiple mobile phones can select a particular mobile phone as being preferred so that any sessions to be routed to a mobile phone will be routed to that specified phone.

For another example, the destination party can specify a preference order based on rules such as time of day rules. For yet other examples, the destination party can specify rules based on delivery costs (e.g., prefer relatively inexpensive e-mail delivery over more expensive wireless phone messaging), and/or rules based on the compatibility between the format of the received message and the user interfaces of the destination entities.

At step 430, the text message is reformatted based on the capability information associated with the selected destination entity. For example, if the received text message is intended for a wireless phone having a 120-character display but the message includes a short text portion and an attached multimedia file, such a text message can be reformatted by removing the multimedia file and including only the text portion. (In such a case, the reformatted message can be sent to the wireless phone and a copy of the original message with the multimedia file can also be sent to an e-mail application associated with a personal computer of the destination party.)

At step 440, the destination address of the text message is reassigned from the virtual address to the destination address of the selected destination entity. At step 450, the text message is sent to the selected destination entity.

Although the present invention has been discussed above in reference to examples of embodiments and processes, other embodiments and/or processes are possible. For example, although the FIG. 1 illustrates a single communication network 100 and various coupled entities (such as, for example, messaging service platform 160, destination entities 150, 180 and 190, etc.), other configurations are possible. For example, rather than a single network, multiple networks interconnected by the appropriate network gateways, routers and/or bridges are possible. Similarly, the various entities coupled to the network can be coupled through other arrangements, such as through additional associated networks, gateways, etc.

What is claimed is:

1. A method for configuring a virtual address, comprising:
    receiving a destination address and a capability information associated with each destination entity of a plurality of destination entities associated with a destination party, the plurality of destination entities each being a push-capable, text-message-capable entity;
    associating the plurality of destination entities with a virtual address, the virtual address defining a destination remote from the destination party and remote from premises associated with the destination party;
    receiving an electronic message having a destination address corresponding to the virtual address, the electronic message including at least a text-based portion;
    dynamically sensing an availability of a destination entity from the plurality of destination entities without sending a user-perceivable indication to the first destination entity; and reassigning the destination address of the electronic message to a destination address associated with the first destination entity when the sensed availability associated with the first destination entity indicates that the first destination entity is available; and reassigning the destination address of the electronic message to a destination address associated with a second destination entity when the sensed availability associated with the first destination entity indicates that the first destination entity is unavailable, the reassigning of the destination address being performed without sending a user-perceivable indication to the first destination entity, and reformatting the electronic message based on the capability information associated with the destination entity designated as available.

2. The method of claim 1, further comprising:

reassigning the destination address of the electronic message to a destination address associated with a destination entity from the plurality of destination entities designated as available.

3. The method of claim 1, further comprising:

receiving a destination address and a capability information associated with a destination entity also associated with the destination party and not from the plurality of destination entities; and associating the destination entity with the virtual address.

4. The method of claim 1, further comprising:

receiving an indicator associated with a destination entity from the plurality of destination entities, the indicator indicating that the destination entity is no longer associated with the destination party; and disassociating the virtual address with the destination entity.

5. The method of claim 1, further comprising:

receiving an indicator associated with a destination entity from the plurality of destination entities, the indicator designating the associated destination entity as available.

6. A computer readable storage medium containing software code executable by a computer to configure a virtual address, the software code comprising:

code to receive an electronic message addressed to a virtual address associated with a destination party, the virtual address defining a destination remote from the destination party and the destination party premises; code to receiving an electronic message having a destination address corresponding to the virtual address, the electronic message including at least a text-based portion, code to reassign the destination address of the electronic message to a destination address associated with a first destination entity from the plurality of destination entities when the sensed availability associated with the destination party, wherein the first destination entity has an associated capability information indicate that the first destination entity is unavailable, the reassigning of the destination address being performed without sending a user-perceivable indication to the first destination entity; and code to dynamically sense an availability of a first destination entity from the plurality of destination entities without sending a user-perceivable indication to the first destination entity, the destination address of the electronic message being reassigned to a destination address associated with the first destination entity when the sensed availability associated with the first destination entity indicates that the first destination entity is available, and reformatting the electronic message based on the capability information associated with the destination entity designated as available.

7. The computer executable software code of claim 6, further comprising:

code to dynamically sense an availability of the first destination entity without sending a user-perceivable indication to the first destination entity, the destination address of the electronic message being reassigned to a destination address associated with a second destination entity when the sensed availability associated with the first destination entity indicates that the first destination entity is unavailable.

* * * * *